United States Patent [19]
Matrascia et al.

[11] Patent Number: 5,777,220
[45] Date of Patent: Jul. 7, 1998

[54] DEVICE FOR A BRAKING AND TRACTION TEST OF A WHEEL COMPRISING A RIM AND A TIRE

[75] Inventors: Giuseppe Matrascia, Seregno; Carlo Monguzzi, Monza, both of Italy

[73] Assignee: Pirelli Coordinamento Pneumatici S.p.A., Milan, Italy

[21] Appl. No.: 752,256

[22] Filed: Nov. 18, 1996

[30] Foreign Application Priority Data

Nov. 21, 1995 [IT] Italy .................. MI95A2397

[51] Int. Cl.$^6$ .................................. G01M 17/02
[52] U.S. Cl. .................................. 73/146; 73/8
[58] Field of Search .................... 73/146, 8

[56] References Cited

U.S. PATENT DOCUMENTS

| | | | |
|---|---|---|---|
| 5,014,551 | 5/1991 | Beebe et al. | 73/146 |
| 5,375,464 | 12/1994 | Dadt | 73/146 |

FOREIGN PATENT DOCUMENTS

| | | |
|---|---|---|
| 1157385 | 5/1985 | U.S.S.R. |
| 1755093 | 8/1992 | U.S.S.R. |

OTHER PUBLICATIONS

P.W.A. Zagelaar et al, "Tyre Models for the Study of In–Plane Dynamics" *The Dynamics of Vehicle on Roads and on Tracks, Supplement to Vehicle System Dynamics*, vol. 23, pp. 578–590 (1994).

R.S. Sharp et al, "The Influence of Structural Flexibilities on the Straight–running Stability of Motorcycles" *Vehicle Systems Dynamics 9*, pp. 327–357 (1980).

David A. Sacrist et al, "A Simultation of Vehicle and Tire Dynamics," pp. 139–146, 1974 Joint Automatic Control Conference (1974).

O.P. Agrawal et al, "A Superelement Model Based Parallel Algorithm for Vehicle Dynamics" *Computer & Structures*, vol. 51, No. 4, pp. 411–423 (1994).

*Primary Examiner*—George M. Dombroske
*Assistant Examiner*—Joseph L. Felber
*Attorney, Agent, or Firm*—Watson Cole Stevens Davis, P.L.L.C.

[57] ABSTRACT

A device for a braking and traction test of a wheel integral with a hub that is free to rotate, comprises a road-wheel, a crank integral with the hub and a connecting rod that causes the reciprocating movement of a piston sealingly sliding in a chamber of a cylinder containing air. The piston exerts on the wheel and on the tire a sinusoidal torque consisting in a braking torque during its compression stroke and in a traction torque during its expansion stroke. The device also comprises a first deformation transducer associated with the hub and a second and a third speed transducer associated with the hub and with the road-wheel, respectively.

2 Claims, 1 Drawing Sheet

5,777,220

DEVICE FOR A BRAKING AND TRACTION TEST OF A WHEEL COMPRISING A RIM AND A TIRE

FIELD OF THE INVENTION

The present invention relates to a device for a braking and traction test of a wheel comprising a rim and a tire.

BACKGROUND DISCUSSION

One of the characteristic parameters of a tread of a tire is the longitudinal stiffness per unit of length Cp of the tread under the contact area with the road. This parameter is calculated starting from a concentrated parameter constituted by the total longitudinal stiffness Ckx of a "brush model" that simulates the tread in the contact area a: (Ckx=$2a^2$Cp). In order to determine the total longitudinal stiffness Ckx, the tire is subjected to a braking test with a dynamometric carriage, also known as a "braking carriage".

The carriage, on which there is mounted a wheel comprising the tire under test, is moved by a vehicle, from which the braking action on the carriage is operated, along a suitable very smooth track, made of marble tiles. On the wheel there are mounted two load cells for measuring the longitudinal force, that arises when a braking torque is applied to the wheel. On the same wheel there is also mounted a speed transducer (phonic wheel), in order to measure its angular speed. A Peiseler wheel is mounted on the vehicle, for measuring the forward speed of the carriage. There is mounted on the carriage a system for the acquisition of signals of force and of slipping speed coming from the carriage, which are transmitted by telemetering means to a control tower. The slipping speed of the tire means the difference between the forward speed of the carriage and the peripheral speed of the tire.

The test consists in applying a "random" braking torque (so as to have the widest possible frequency content and to take into account the fact that longitudinal stiffness varies with frequency) and in determining the transfer function between the signals of longitudinal force at the hub of the wheel (output), and the slipping movement of the tire (input). The limit, for a frequency tending to zero, of the transfer function between longitudinal force and slipping movement, is the total longitudinal stiffness Ckx of the tread under the contact area. The longitudinal stiffness per unit of length of the tread Cp is given by the ratio Ckx/$2a^2$.

This test with the braking carriage is fairly critical because it is performed on a track located outdoors, where the causes of error of the results are more difficult to identify and where the tests are influenced by environmental conditions and by the state of conservation of the track.

SUMMARY OF THE INVENTION

The object of the present invention is a device for a braking and traction test of a tire that gives accurate and repeatable results and makes it easy to perform the test.

The above mentioned object is attained, according to the invention, by a device for a braking and traction test of a wheel comprising a rim and a tire, integral with a hub that is free to rotate, said device comprising a road-wheel rotating at preselected speeds, a crank integral with said hub, a connecting rod connected by means of a pivot to said crank and by means of a pin to a piston sealingly sliding in a chamber of a cylinder containing air, closed by a head, first deformation transducer means associated with said hub, capable of measuring the longitudinal force transmitted by said tire to said hub, second and third speed transducer means associated with said hub and with said road-wheel, respectively, capable of measuring the slipping speed of said tire, said tire being caused to rotate by said road-wheel and driving said piston, through said crank and connecting rod, to execute a reciprocating movement inside said cylinder performing a compression stroke and an expansion stroke of said air in said chamber so as to exert on said wheel and on said tire a sinusoidal torque consisting in a braking torque during said compression stroke and in a traction torque during said expansion stroke.

The device according to the invention enables to perform the braking tests of a tire indoors instead of outdoors, as is the case with the traditional dynamometric carriage. Thus, the tests can be run more easily and they provide measures with a degree of accuracy that is higher than those performed with the dynamometric carriage. Moreover, the causes of noise of the experimental signals can be identified more easily.

The test consists in applying a sinusoidal torque of suitable amplitude, with a frequency ranging from 0.1 to 25 Hz, and in determining the transfer function between the signals of longitudinal force at the hub of the wheel (output) and the slipping speed of the tire (input), meaning the difference between the peripheral speed of the road-wheel and the peripheral speed of the tire. The limit, for a frequency tending to zero, of the transfer function between longitudinal force and slipping movement, is the total longitudinal stiffness Ckx of the tread under the contact area.

In this indoor test, there is the advantage of a greater accuracy in measuring the value of the longitudinal force at low frequencies (0.1Hz).

The longitudinal stiffness per unit of length of the tread Cp, is given by the ratio Ckx/$2a^2$. Since this stiffness is a function of the tread mixture, as well as of the design, it follows that the stiffness is a function of the frequency and this is taken into account in the "brush model" designed by the Applicant.

BRIEF DESCRIPTION OF THE DRAWINGS

Features and advantages of the invention will now be illustrated with reference to embodiments represented as non-limiting examples in the enclosed figures, wherein.

DETAILED DESCRIPTION OF THE PREFERRED EMBODIMENTS

Figure 1:
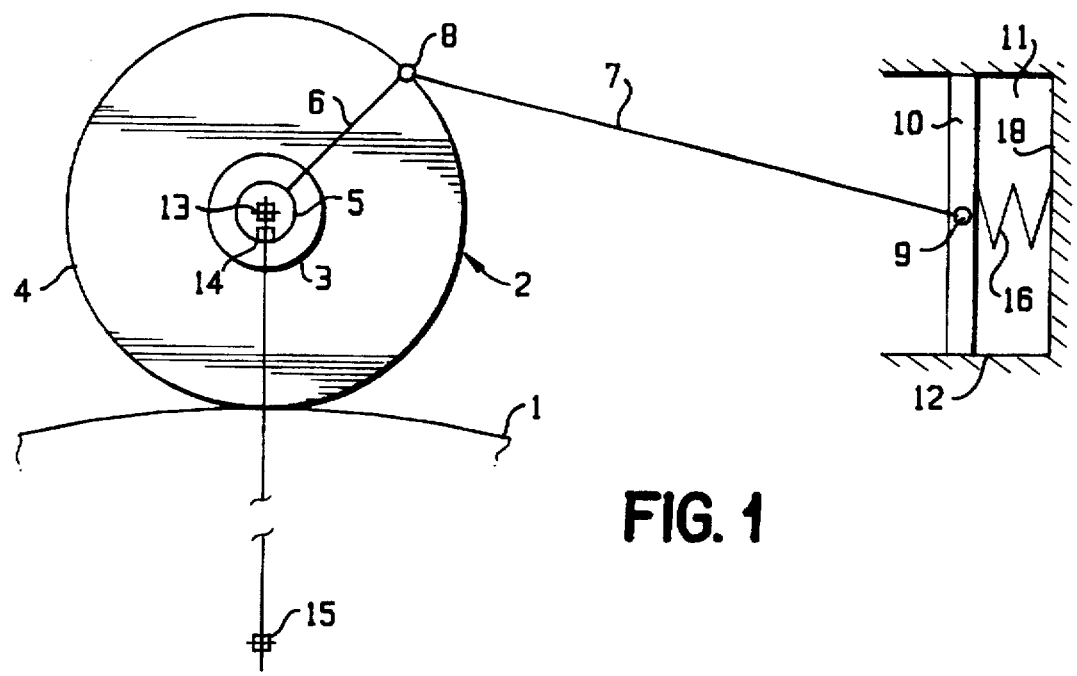
FIG. 1 shows diagramatically a device for a braking and traction test of a wheel comprising a rim and a tire, made according to the invention.

There is shown in FIG. 1 a device for a braking and traction test made according to the invention. The device comprises a road-wheel 1 caused to rotate at preselected speeds by an electric motor, not shown, a wheel 2, comprising, in turn, a rim 3 and a tire 4, caused to rotate by the road-wheel 1, and a dynamometric hub 5 made integral with the rim 3 of the wheel 2 and free to rotate, being rotatably supported by a base, not shown. The device also comprises a crank 6, integral with the hub 5, and a connecting rod 7 that has one end (head) connected by means of a pivot 8 to the crank 6 and another end (foot) connected by means of a pin 9 to a piston 10 sealingly sliding in a chamber 1 1 of a cylinder 12 containing air, closed by a head 18. The stiffness of the air inside the chamber 11 is shown diagramatically by a spring 16. A transducer of deformation 13, fastened to the hub 5, measures the longitudinal force transmitted by the wheel 2 to the hub 5 and two transducers of angular speed 14 and 15, fastened to the hub 5 and to a hub (not shown) of the road-wheel 1, respectively, measure the slipping speed of the tire 4. The transducers of angular speed 14 and 15 consist of high-resolution encoders (accuracy to one thousandth).

With the device it is possible to provide a braking torque and a traction torque to the wheel 2 with the tire 4. The wheel 2 is urged radially against the road-wheel 1 by a preselected vertical force applied to the hub 5 that represents the share of the weight of a vehicle bearing on a wheel. The road-wheel 2 causes the rotation of the tire 4, which through the crank 6 and the connecting rod 7 causes the piston 10 to move with a reciprocating motion to perform a compression stroke and an expansion stroke. When the piston 10 is in the compression stroke, through the connecting rod 7 and the crank 6, the wheel 2 with the tire 4 is braked, while when the piston 10 is in the expansion stroke the wheel 2 is accelerated.

The signals detected by means of the transducers 13, 14 and 15 are the longitudinal force at the dynamometric hub 5 and the slipping speed meaning the difference between the peripheral speed of the road-wheel 1 and the peripheral speed of the tire (with no torque on the tire the slipping speed is zero).

Figure 2:
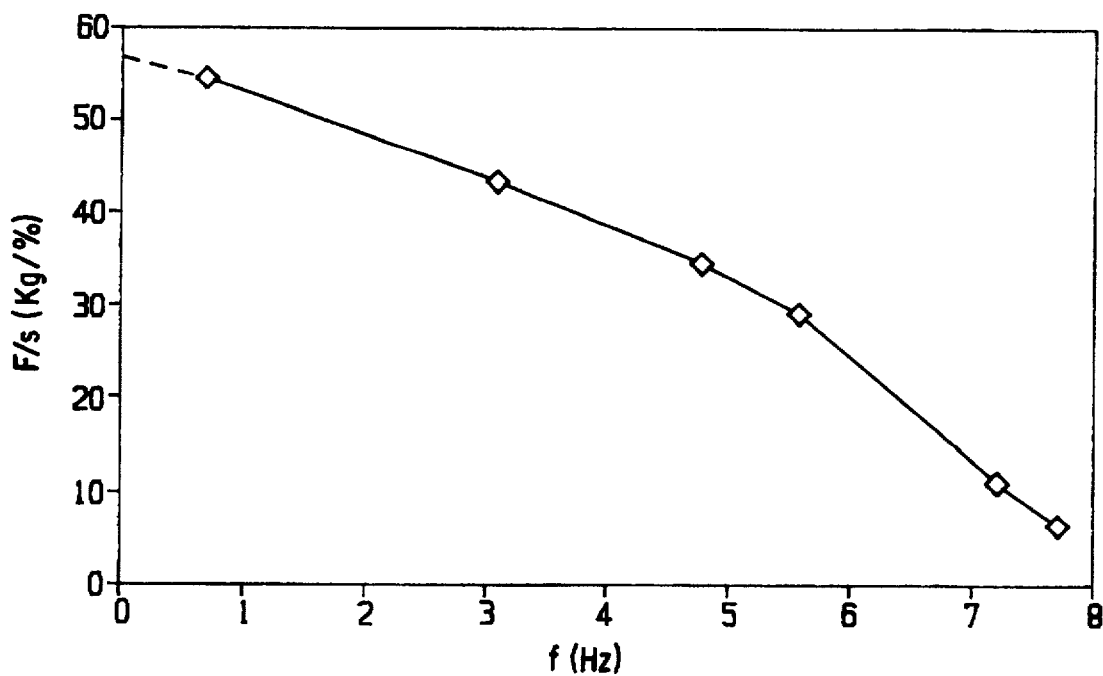
FIG. 2 is a graph showing the curve of a transfer function between longitudinal force and slipping speed against the frequency, observed on a wheel subjected to a braking test with the device of FIG. 1.

There is a shown in FIG. 2 the curve of a transfer function consisting of the ratio F/s between the signals of longitudinal force at the hub of the wheel (output) and the slipping speed of the tire (input) (kg/%) against the frequency f (Hz) of the sinusoidal torque applied by the piston 10 to the wheel 2, for a tire P6000 manufactured by Societa Pneumatici Pirelli S.p.A. and having a tire size of 185/60 R14 and having an inflation pressure p=2 bar, at a speed of the road-wheel of 50 kph. The limit, for a frequency tending to zero (dashed line in FIG. 2), of the transfer function between longitudinal force and slipping movement, is the total longitudinal stiffness Ckx of the tread under the contact area.

We claim:

1. A device for a braking and traction test of a wheel comprising a rim and a tire, integral with a hub that is free to rotate, said device comprising a road-wheel rotating at preselected speeds, a crank integral with said hub, a connecting rod connected by means of a pivot to said crank and by means of a pin to a piston sealingly sliding in a chamber of a cylinder containing air, closed by a head, first deformation transducer associated with said hub, capable of measuring the longitudinal force transmitted by said tire to said hub, a slipping speed measuring means comprising a second speed transducer associated with said hub and a third speed transducer associated with said road-wheel, said, tire being caused to rotate by said road-wheel and driving said piston, through said crank and connecting rod, to execute a reciprocating movement inside said cylinder performing a compression stroke and an expansion stroke of said air in said chamber so as to exert on said wheel and on said tire a sinusoidal torque consisting of a braking torque during said compression stroke and a traction torque during said expansion stroke.

2. The device of claim 1, wherein said sinusoidal torque has a frequency ranging from 0.1 to 25 Hz.

* * * * *